(12) United States Patent
Pearson et al.

(10) Patent No.: US 12,153,777 B2
(45) Date of Patent: Nov. 26, 2024

(54) SYSTEM AND METHOD UTILIZING MULTIPLE VIRTUAL PRESENCE DEVICES

(71) Applicant: Cre8 Ideaz, LLC, North Potomac, MD (US)

(72) Inventors: Herbert C. Pearson, North Potomac, MD (US); James J. Murray, Clifton, VA (US); Englebert Jimenez, Woodbridge, VA (US); Margaret A. Phillips, Winchester, TN (US); Michael C. Pearson, Baltimore, MD (US)

(73) Assignee: Cre8 Ideaz, LLC, North Potomac, MD (US)

( * ) Notice: Subject to any disclaimer, the term of this patent is extended or adjusted under 35 U.S.C. 154(b) by 0 days.

(21) Appl. No.: 18/079,092

(22) Filed: Dec. 12, 2022

(65) Prior Publication Data

US 2023/0214097 A1    Jul. 6, 2023

Related U.S. Application Data

(60) Provisional application No. 63/393,990, filed on Aug. 1, 2022, provisional application No. 63/333,206, filed (Continued)

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06F 16/9537* (2019.01); *G07C 9/00174* (2013.01)

(58) Field of Classification Search
CPC .. G06F 16/9537; G06F 3/0482; G06F 3/0484; G07C 9/00174
See application file for complete search history.

(56) References Cited

U.S. PATENT DOCUMENTS

| 6,292,713 B1 | 9/2001 | Jouppi et al. |
| 8,463,435 B2 | 6/2013 | Herzog et al. |

(Continued)

*Primary Examiner* — Andrea C Leggett
(74) *Attorney, Agent, or Firm* — BACON&THOMAS, PLLC

(57) ABSTRACT

A virtual presence system and method integrates multiple virtual presence technologies, including the ability to enable a user to experience a remote location through a plurality of different types of virtual presence devices. The different types of virtual presence devices might include virtual presence robots, as well drones, land vehicles, devices arranged to be worn by a human, and other virtual presence devices, all of which are accessible through a single website hosted on a server that provides links to the different types of virtual presence devices at selectable locations through a hierarchical query database that stores geographic coordinates, types, and features of the virtual presence devices, GIS to analyze and display geographic information, and communication methods, together with IP addresses and/or aliases that enable the devices to be accessed and controlled. The virtual presence system and method may optionally also utilize virtual reality headsets and haptic feedback devices designed to worn by users for a more immersive experience.

38 Claims, 7 Drawing Sheets

Related U.S. Application Data on Apr. 21, 2022, provisional application No. 63/294,931, filed on Dec. 30, 2021.

(51) Int. Cl.
  *G06F 16/9537* (2019.01)
  *G07C 9/00* (2020.01)

(56) References Cited

U.S. PATENT DOCUMENTS

| | | |
|---|---|---|
| 8,994,776 B2 | 3/2015 | Sutherland et al. |
| 9,601,022 B2 | 3/2017 | Taveira |
| 2010/0131366 A1* | 5/2010 | Gibson .................. G06Q 30/06 705/14.58 |
| 2012/0166576 A1* | 6/2012 | Orsini ................... G06F 9/3863 709/217 |
| 2014/0309870 A1* | 10/2014 | Ricci ..................... G06F 3/0481 701/36 |
| 2015/0312344 A1* | 10/2015 | Anderton ............... G06Q 10/06 709/203 |
| 2019/0388791 A1* | 12/2019 | Lapoint ................. A63F 13/327 |

* cited by examiner

SYSTEM AND METHOD UTILIZING MULTIPLE VIRTUAL PRESENCE DEVICES

This application claims the benefit of U.S. Provisional Patent Appl. Ser. Nos. 63/294,931, filed Dec. 30, 2021; 63/333,206, field Apr. 21, 2022; and 63/393,990, filed Aug. 1, 2022.

BACKGROUND OF THE INVENTION

1. Field of the Invention

The invention generally relates to a system and method for enabling users to experience remote locations via multiple virtual presence devices situated at the remote locations.

More particularly, the invention relates to a system and method of enabling instantaneous and seamless switching between virtual presence devices, including different types of virtual presence devices and devices situated at different locations, by using a virtual device control protocol and query database to track virtual presence resources and assign or allocate them to users.

For example, if the system and method of the invention is used to provide virtual travel experiences, the virtual presence resources may be applied based on user input of itineraries that may include times, locations, venues, attractions, and other tour features. The different types of virtual presence devices may include robots, drones, vehicles, and devices or equipment worn or carried by a human at the remote location, as well as virtual reality devices such as VR headsets, gloves, shoes, and body suits that may be worn by users to provide a more immersive experience.

The system and method of the invention may be used to enable "pre-travel" to a destination to plan an actual trip, including lodgings and activities at the destination, or simply to enable the user to experience a destination instead of actually traveling to the destination. The system and method of the invention may be used to, by way of example and not limitation, to evaluate college campuses in a virtual college tour that includes interviews with students, professors, or coaches, to learn about different countries or cultures, to drive a scenic highway, or even to stand in line at the remote destination to obtain concert or exhibition tickets.

The virtual travel experiences made possible by the system and method of the invention may be recorded, for example for future access or sharing of travel experiences with friends and colleagues, or social media.

In addition to virtual travel experiences, the system and method of the invention may be used to virtually explore or gain access to a destination or area for purposes other than "travel," such as to find missing persons, to search or monitor a destination or area that is too dangerous, remote, or inconvenient for in-person monitoring or information gathering, to monitor vehicle repairs by utilizing heat-protected cameras within various compartments of a vehicle, to access police body cam video with proper approval, to follow and interact with adventurers such as mountain climbers, divers, or astronauts, or to enable remote access and monitoring of home repair or delivery persons by utilizing a robot to meet, authenticate, and maintain continuous surveillance of the home repair or delivery persons while in the user's residence.

2. Description of Related Art

While the improvements to virtual presence technology, and in particular the virtual presence infrastructure provided by the present invention, have applications that are not limited to travel or tourism, the invention was initially developed for the purpose of adapting virtual presence technology to address challenges facing the travel industry.

The travel industry is changing rapidly. Thanks to the Internet, travelers can gather detailed information on any potential destination, including information on facilities, activities, and attractions, allowing informed selection of itineraries and pre-booking of lodging and tours that better meet the unique needs and desires of individual travelers and maximize their experience. This ability to pre-travel is especially critical in an age of Covid-limited travel opportunities, or more generally as working hours expand and leisure or vacation time decreases, reducing travel opportunities.

However, the increase in available travel-related Information is not without disadvantages. Pictures, videos, and even reviews are not a substitute for actual presence at the destination. Reviews tend to be unreliable since they inevitably reflect the idiosyncrasies and biases of the reviewer, while videos and pictures intended to attract visitors to a particular hotel, resort, or vacation location will inevitably omit aspects of the location that are less desirable. There is still no way to truly explore potential destinations in a way that completely meets the needs and expectations of individual travelers, allowing them to actually "experience" the potential destination before making a decision.

A need, therefore, exists for a virtual travel experience that allows the end-user to explore a remote venue as if the user were present at the venue. The present invention does so by adapting "virtual presence" technology to enable roving, multi-point, real-time viewing of attractions and venues at a selected destination, utilizing multiple devices that offer a variety of viewpoints, augmented by humans, over an extended area within a selected geographic location. The user can select a geographic location and seamlessly switch between different devices. This helps the user to experience a virtual tour based on a simple and transparent user interface that does not require knowledge of the individual devices. This is in contrast to conventional virtual presence robots, drones, and the like, which are typically pre-assigned or dedicated to credentialed users to perform specific tasks, such as inspection of a facility or representing the user at a meeting or conference.

The ability to select different locations and seamless switch between difference devices can by used to provide a user with a more comprehensive suite of virtual presence experiences, including not only virtual tours that utilize multiple types of virtual presence devices, but also to make possible or enhance a wide variety of virtual presence experiences or applications, such as monitoring the progress of vehicle repairs, enabling access to and monitoring of home repair technicians or delivery persons, following along with and "experiencing" the activities of adventurers such as mountain climbers, divers or astronauts, accessing police body cam video, and so forth.

An example of a currently-available system that allows users to "tour" remote locations without the use of virtual presence devices is Amazon's AmazonExplore™ system, which allows users to follow and interact with live tour guides through a video-phone connection. A disadvantage of only using human tour guides is that users cannot customize their experiences, or be presented with a diverse range of views of a particular location, such as both ground and aerial views. In addition, systems such as the Amazon system do not enable the user to visit, in a single "tour," multiple spatially-separated venues, such as attractions that are located in different parts of a large metropolitan area.

On the other hand, an example of a "virtual presence device" of the type that may be utilized by the present invention, but which is conventionally used in contexts other than those of the present invention, is disclosed in U.S. Pat. No. 6,292,713, which discloses a mobile "telepresence" robot complete with an array of cameras and a display that allows persons at the remote location to interact with the controller of the device as if he or she were present at the remote location. In addition, commercially-available telepresence robots, which are used for teleconferences, are disclosed in https://telepresencerobots.com and https://arielgroup.com/programs/virtual-presence.

Another example of a conventional virtual presence device, in the form of a robot that can have multiple users, is disclosed in U.S. Pat. No. 8,463,435. The system disclosed in this patent is used in applications for which access must be limited to credentialed users, such as healthcare or hazardous waste removal, and therefore the system disclosed in the patent includes a mechanism for determining access priority based on user IDs. In a healthcare embodiment, the IDs are stored in a database at an access server that enables members of the group whose IDs are stored to access features of a patient-monitoring robot at a hospital or residential care facility. A guest feature allows non-members to also access features of the robot, but the system is not intended for applications for the general public, such as the virtual or pre-travel experiences provided by the present invention.

The credential database of U.S. Pat. No. 8,463,435 is suitable for enabling access to specific types of robots at defined locations, but unlike the query database of the present invention does not provide access to multiple types of devices in different locations. A practical virtual travel experience, for example, requires more than just the ability to control one or a limited number of identical or similar robots. To fully explore a destination, different types of devices are preferably provided, including both fixed video capture devices and mobile devices such as camera-equipped robots and various ground, air, and marine vehicles, depending on what the user wishes to experience. For example, it may be helpful to allow the user to switch from a ground view to an aerial view, i.e., from a robot or terrestrial vehicle to a drone. In some cases, interaction with persons at a remote location may be desired, while at other times, privacy or discretion may be preferred. In addition, by way of example, a robot located in a museum will have substantially different characteristics than a robot designed to explore a wilderness area. The museum robot would likely need to be silent and adapted for video viewing only, while the wilderness robot might need to be traversing different terrains and weather conditions. The system of U.S. Pat. No. 8,463,435 does not provide such flexibility.

Similarly, U.S. Pat. No. 9,601,022 provides an example of a system for controlling a drone that utilizes a database, but not to provide access to different types of virtual presence devices, which would make it more suitable for virtual tourism. Instead, the system utilizes GPS to ensure that the drone does not violate any location-based airspace restrictions and also provides for location-based payment of tolls, the restrictions, and tolls being stored in the database.

On the other hand, U.S. Pat. No. 8,994,776, discloses the use of a mobile virtual presence robot to provide a travel experience. In one embodiment, the virtual presence robot is arranged to follow a tour guide and allows remote users to interact with the tour guide. However, while the system and method of this patent are used in a "travel" context, the experience is limited to a single type of device and context, namely what is essentially a "walking" tour of the selected location. The patent does not provide a way to switch between devices or to enable a user to select from among different locations and types of venues or experiences.

SUMMARY OF THE INVENTION

It is accordingly a first objective of the present invention to provide a system and method that enables users to explore a variety of sites and activities at multiple selected destinations, for a virtual travel experience that more completely simulates actual travel to the selected destination(s).

It is a second objective of the invention to provide a virtual presence system that can enable a remote user to switch seamlessly between a variety of different devices at different locations, without the need to authenticate the user each time the user switches devices.

It is a third objective of the invention to provide a virtual presence system that not only utilizes a variety of different virtual presence devices, but also allows users to select from a variety of augmented experiences, including two-way interaction with persons at the remote location, and augmented reality features such as labeling of scenes and the inclusion of background text or prerecorded narration, or hyperlinks to websites associated with visited venues or attractions, for example to food delivery or shopping websites.

It is a fourth objective of the present invention to allow users to experience travel to or visit different parts of the U.S. or the world at a fraction of the cost of in-person travel.

It is a fifth objective of the invention to provide novel human-centered virtual presence equipment arranged to be worn by humans at the remote location, and that may be utilized in addition to, or in place of, conventional virtual presence robots, to enhance the virtual presence experience by taking advantage of the greater mobility of humans relative to robots.

It is a sixth objective of the invention to adapt the virtual presence infrastructure provided by the invention to applications other than virtual travel experiences such as, by way of example and not limitation, monitoring the progress of vehicle repairs, enabling access to and monitoring of home repair technicians or delivery persons, following along with and "experiencing" the activities of adventurers such as mountain climbers, divers or astronauts, accessing police body cam video, and so forth.

These objectives are achieved, in accordance with the principles of a preferred embodiment of the invention, by a system and method that integrates multiple virtual presence technologies, including the unique ability to enable a user to experience a remote location through a plurality of different types of virtual presence devices. The different types of virtual presence devices might include, by way of example and not limitation, virtual presence robots situated at different locations, as well as drones, land vehicles, and other virtual presence devices, all of which are accessible through a single website hosted on a server that provides links to the different types of virtual presence devices at selectable locations through a hierarchical query database accessible by the geographic coordinates, virtual presence device type, and virtual presence device features, and which further stores IP addresses through which the devices may be accessed and controlled. An itinerary created by a user through the travel experience website could, for example, include a walking tour of a museum, a visit to a local pub including the ability to converse with diners, and a narrated drive around the city followed by a flight over the surrounding countryside, and be capped off by a theatrical production or concert using fixed cameras.

Upon selection of a particular geographic location, the user is presented with a list of venues or attractions that can be visited, as well virtual presence device options and features to establish a specific itinerary, and allowed to schedule the tour. Once an itinerary is established, the server will update a table that keeps track of available devices, and transmit the itinerary to the devices, a controller, and/or personnel at the geographic location. The selected devices will then be activated at the scheduled time and beginning transmission of video, still images, and/or audio. For mobile devices, the devices may follow a predetermined path based on the itinerary selected by the user, with different devices being utilized as necessary for different portions or aspects of the tour (e.g., to provide ground and aerial views). Optionally, the user may be provided with the ability to pause the tour and "look around" by pausing forward motion of the virtual presence device and manipulating camera angle or audio options before resuming the tour. The tour may be accompanied by narration, and may optionally provide opportunities to interact with persons at the location, to ask questions or otherwise converse through the use of two way teleconference features on the virtual presence, if available. The interactivity capabilities may be adapted to enable users to attend events at the remote location, such as school reunions, with the added capability of allowing the user to move around the event venue and interact with different attendees.

To enable seamless selection and switching of devices, the invention utilizes communication protocols, Geographical Information System (GIS), and geocaching to represent device locations as nodes on a map of a geographic location selected by the user, the nodes being associated with IP addresses of the devices and a list of features, capabilities, location, and control parameters of the devices stored as entries in a query database.

The option of including hyperlinks enables the user to, for example, order delivery of particular dishes from a local restaurant while virtually "visiting" a restaurant at the remote location, or to shop for items offered by vendors at the remote location. Other features that may be provided include instantaneous translations when "speaking" with locals through a virtual presence robot, the ability to be in two places at once by splitting screens, and the ability to pause and change an itinerary in real time as the virtual "tour" is proceeding in order to more fully explore an area of interest.

It will be appreciated that the invention is not limited to particular types of virtual presence devices, and may include not only robots, land vehicles, and drones, but also watercraft and even submersible devices, as well as two-way communication devices such as video lanyards that can be worn by a human tour guide, and fixed video capture devices or webcams. In addition, the virtual presence devices may include not only video capture capabilities, but also other sensors to enhance the experience, such as chemical sensors that enable smells or tastes to be simulated or reproduced.

According to one preferred embodiment of the invention, virtual presence robots at the remote location may be replaced or supplemented by equipment adapted to be worn or carried by a human to provide an enhanced human-centered virtual presence experience. The equipment for providing the enhanced human-centered virtual presence experience may be addressable through the same virtual presence interface as the above-mentioned robots, drones, and other vehicles, and therefore capable of seamless inclusion or integration into a virtual travel experience or tour, while providing enhanced mobility in particular situations or environments. It will be appreciated that the enhanced human-centered virtual presence equipment may also be used in contexts other than the virtual travel experience of the illustrated embodiment.

In addition, the virtual presence experience may be further enhanced at the user end by providing the user with equipment such as a virtual reality headset and haptic feedback devices that provides the user with a more immersive experience that includes, for example, a full sensation of movement.

As indicated above, although a focus of the invention is on "virtual travel" experiences, the system and method of the invention is not necessarily limited to travel or tourism. For example, the system and method of the invention may be used for the purpose of locating a missing person in multiple areas without having to travel to those areas, by having a robot or person wearing a virtual presence device display pictures of the missing person and/or ask around to gain additional information that can be shared with police in the remote areas. Alternatively, the system and method of the invention may be used to monitor locations that are dangerous or inconvenient to travel to, and/or or to serve as an "information kiosk" in order to answer questions about a community, areas of interest, and so forth.

Additional optional features of the system and method of the invention may include:

(I) placement of robot stations adjacent to "bike-share" or scooter rental stations in various cities, in order to utilize the charging facilities of the stations and increase virtual presence availability or geographic coverage, allowing the user to more easily and quickly "move" between different areas or neighborhoods;

(II) inclusion of camera/display raising/lowering mechanisms in the virtual presence robots used by the system and method of the invention, so that the camera and/or display height can be adjusted to allow interaction with both standing and seated persons at remote locations, as well as with persons of different heights;

(III) use of facial recognition technology, to enable use of a roaming virtual presence robot or device to virtually meet up with friends or colleagues in the remote location;

(IV) enabling multiple users to share a virtual presence device by broadcasting a preset itinerary for the device and allowing the multiple users to share a virtual presence video display at the remote location, allowing individual viewers to ask questions of persons encountered during a tour through an interface similar to a video conference interface;

(V) establishment of a dispatch system at the remote location that allows human robots, i.e., persons wearing a virtual presence device, to indicate availability and location at any time, and also to facilitate payment, in a manner similar to the system used by rideshare apps such as Uber and Lyft;

(VI) use of authentication to limit network access to members, and limiting access to certain devices or device locations, referred to as "nodes," and/or switching between nodes, based on membership;

(VII) provision for anonymous remote camera accessibility through the system website, including access to heat-protected cameras installed within vehicle compartments to monitor vehicle repairs; access to police body cam video or mobile video cameras for adventure-directed people; real-time access to cameras carried by adventurers such as climbers, astronauts, or divers in order to enable users to vicariously experience the adventures;

(VIII) enabling home repair contractors or delivery persons to safely enter a home when the owner is not present to make the repairs or install delivered items by having a robot verify the person's identify or run a background check, let the person in the home or alert police, and enable the homeowner to monitor the contractor's or installer's activities;

(IX) provide for multiple users to determine the movements or activities of a remote presence robot or vehicle, or a human carrying a remote presence device, by enabling the multiple users to vote on different possible movements or activities;

(X) utilize the system and method of the invention to improve or enhance other remote presence activities such remote inspections by enabling use of and switching between multiple devices and types of devices.

DETAILED DESCRIPTION OF THE PREFERRED EMBODIMENTS

Figure 1:
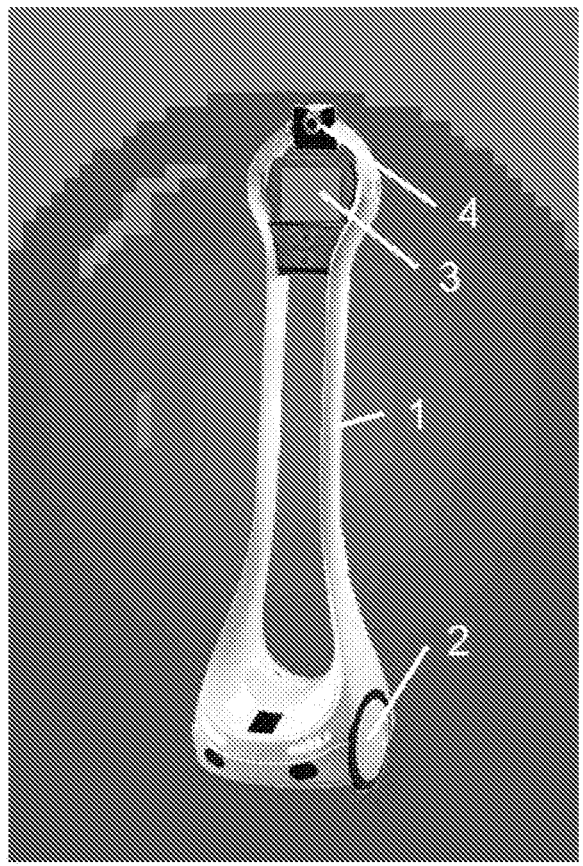
FIG. 1 shows three different types of virtual presence devices that could be utilized in connection with the system and method of the invention.
Figure 1:
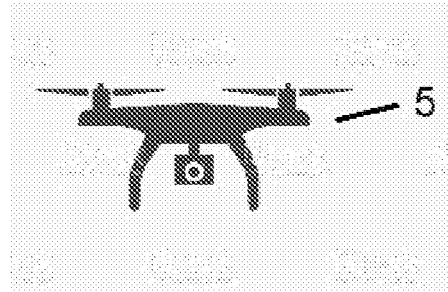
Figure 1:

FIG. 1 shows a few of the "virtual presence" devices that may be utilized by the system and method of the present invention. The devices include a mobile virtual presence robot 1 including motor-driven wheels 2, a video or touch-screen display, and a camera 4. The devices may also include a drone 5 and/or a two-way communication device carried on a lanyard or otherwise worn or carried by a person at the remote location. Each of the devices is in general known, and the invention is not to be limited to particular examples of any of the three illustrated types of devices. In addition, the invention may utilize types of virtual presence devices other than the illustrated devices, such as watercraft or underwater vessels, smartphones carried by a person, fixed video recording arrangements such as might be used to record a concert or show, and so forth.

Figure 2A:
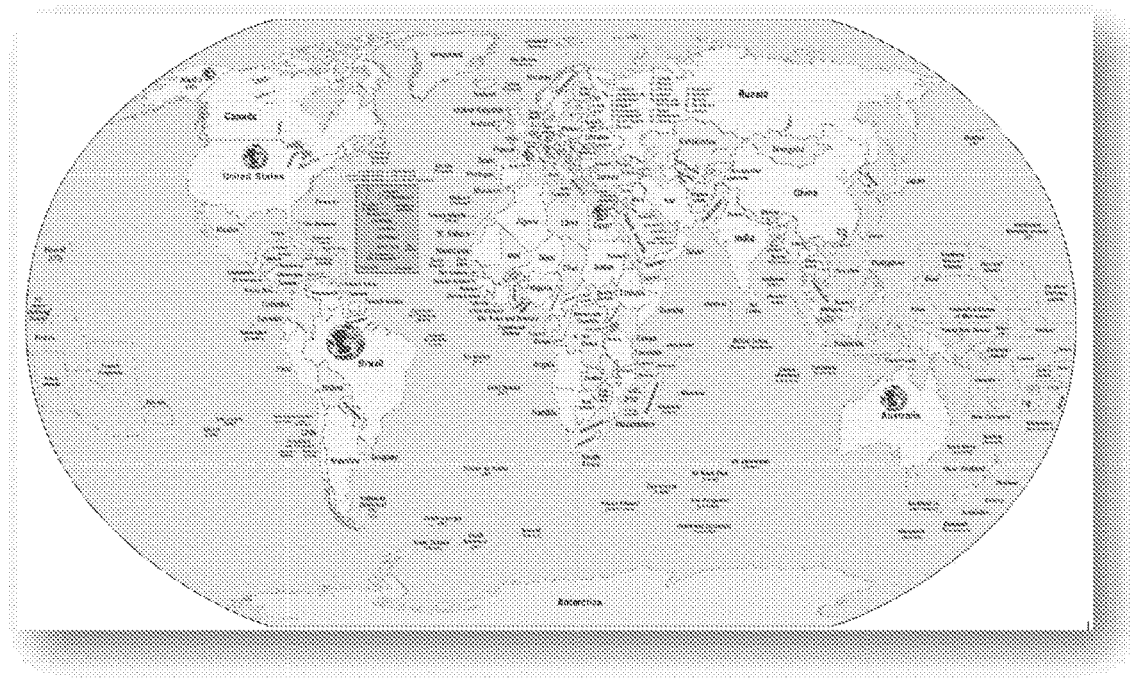
FIGS. 2A-2C are screen shots of maps displayed by the system and method of the invention, from which an end-user may select a geographic location and places to visit, according to a preferred embodiment of the invention.
Figure 2B:
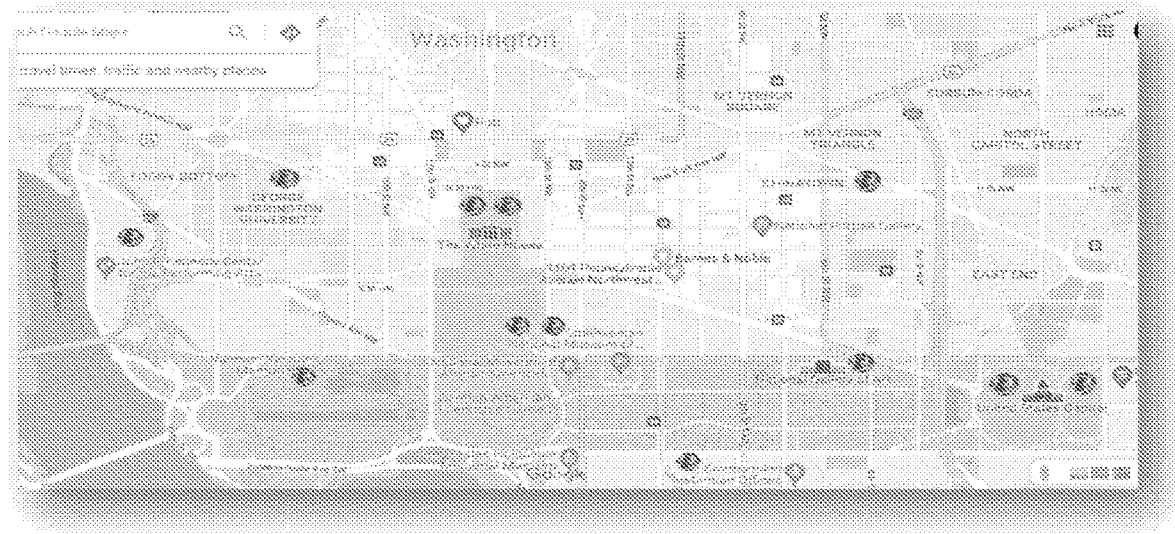
Figure 2C:
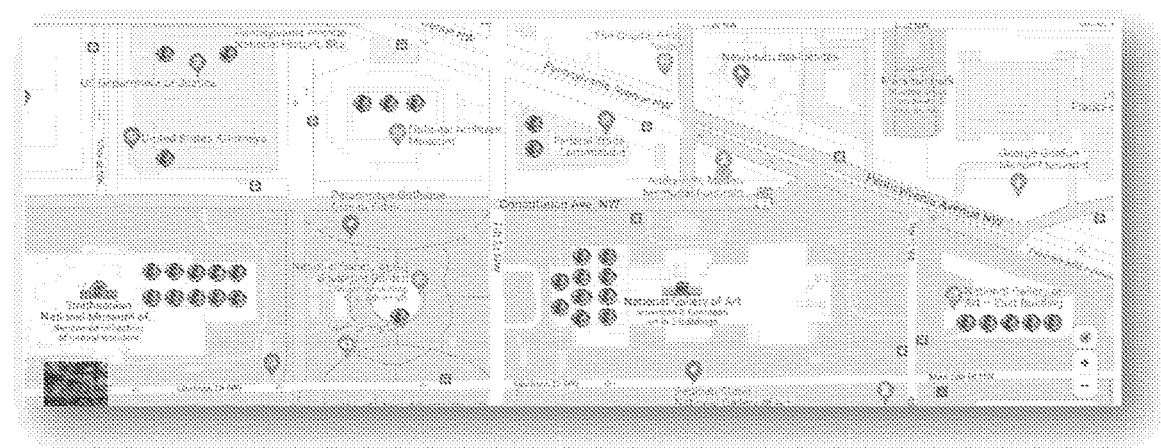

FIGS. 2A-2C illustrated the way the different types of devices may be selected by an end-user through a website according to a preferred embodiment of the present invention. In particular, FIGS. 2A-2C shows a hierarchical series of maps that allow a geographic location to be selected, followed by a selection of places within the geographic locations that can be explored by the virtual presence devices, and a display of virtual presence devices at each place.

The map shown in FIG. 2A is a world map, presented by user interaction module 12 and function block 13, shown in FIG. 3 and described below, following logon or entry into a website. The world map includes icons 7 located within individual countries, the icons indicating that virtual presence devices are presented in the indicated countries. Upon selection of one of the icons 7 in FIG. 2A, a map of the country in which the icon is located may be displayed or, if there is just one selectable location within a country, the location itself may be displayed without first displaying a map of the country. The location may be a state, province, city, or other entity. For example, upon selection of the U.S. in FIG. 2A, a map of the U.S. (not shown) will first be displayed with icons situated in various states and the District of Columbia. If the icon for the District of Columbia is selected, then a map of D.C. will be displayed, as illustrated in FIG. 2B, to show the locations in D.C. that may be explored using virtual presence devices. In the example of FIG. 2B, these locations include museums, the White House, George Washington University, the Smithsonian, the National Gallery of Art, and other attractions, each of which is represented by an icon 8. Upon selection of one of the icons 8, a further more detailed map of the selected location, venue, or attraction is displayed, as illustrated in FIG. 2B. In this map, the icons 9 also represent virtual presence devices, with the number of icons 9 at a particular location, venue or attraction indicating the number of devices at that location. Selection of an icon 9 completes the location selection and is followed by display of a query box or display of a menu to allow the user to schedule a tour at the selected location, venue, or attraction.

The virtual presence devices represented by icons 9 are listed in a query database, shown in FIGS. 4A and 4B and described below, based on IPv4/IPv6 or similar IP address, which may be static or dynamic, as well as device type, characteristics, and selectable options, and exact locations determined, by way of example and not limitation, GPS/GLONASS coordinates or triangulated cellular coordinates.

Figure 3:
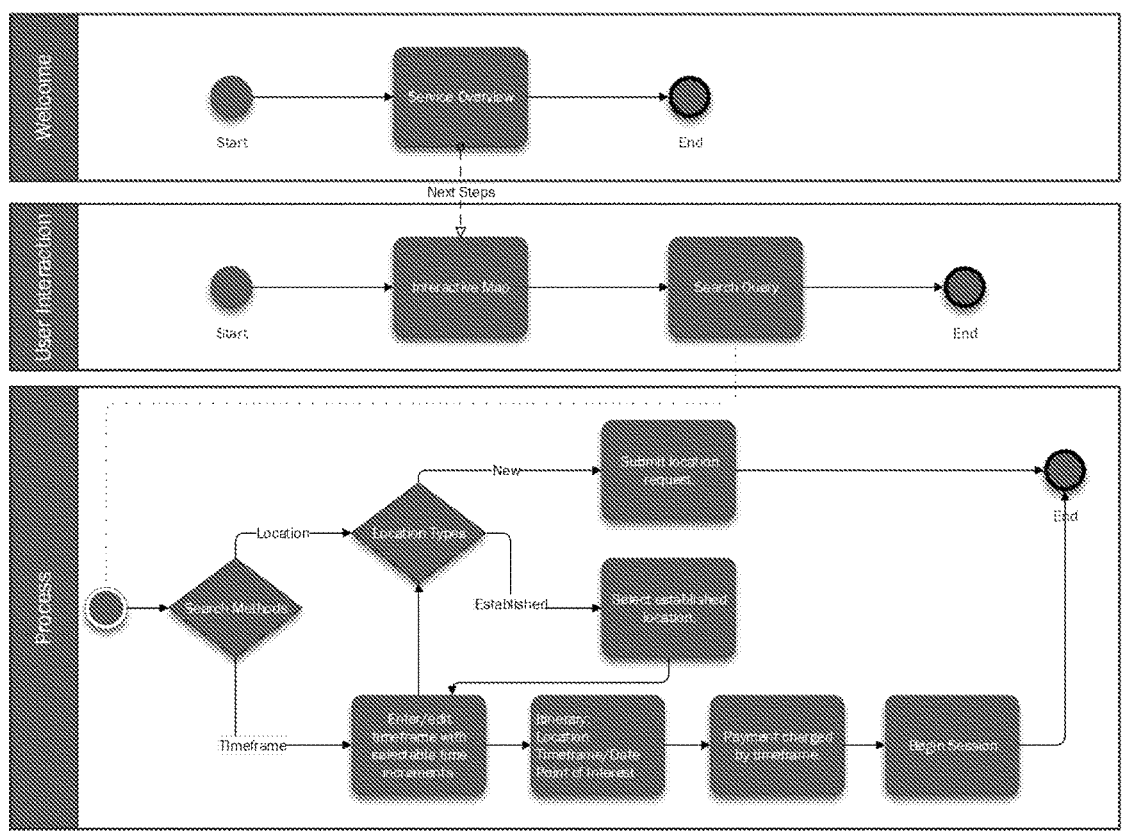
FIG. 3 is a flow diagram illustrating various control modules executed by the system and method of the preferred embodiment.

Turning to FIG. 3, the system and method of the invention utilize multiple program modules executed by a server. The first is a "welcome" module 10 that introduces the system and method and provides examples of experiences by displaying appropriate images and text, as indicated by block 11. The display may include a paywall to enable a user to register and enter the system or to authenticate a user and enable the user to access the system without payment if already registered. According to this optional features, in order to access selected features of the invention, users would need to register as members to use the system and sign-in whenever access is desired. For example, only members would be able to access locations or devices, referred-to as "nodes," within the system. Conversely, the system could be designed so that members could only switch between registered nodes. Access would preferably not depend on the manner in which the system is accessed, whether through a wireless connection (e.g., Wi-Fi, broadband, cellular communications via a mobile device app, and satellite communications), or through a wired network (such as an Ethernet fiber optic cable network).

The second program module 12 displays an "interactive map," of the type illustrated in FIGS. 2A and 2B and represented by block 13, through which a user is able to select a location to "visit." As explained above, upon selection of a geographic location, the map preferably zooms to a more detailed view of the region, allowing the user to select individual regions, countries, or cities which, when selected, may optionally cause the display to zoom to a more local view as appropriate. The operation of the interactive map may be conventional and similar to zoomable maps of the type commonly used in navigation systems or apps such as Google Maps™.

Once the location has been selected, the second program module displays a query box 14 that enables the user to input a specific landmark or attraction to visit. This causes a third program module 15 to initiate and carry out a search. The search may be by location or time frame, as indicated by decision block 16. If the user selects a location, then the user is optionally prompted to select a location type, as indicated by decision block 17. The optional location "types" are established locations, which may be selected from a menu or list of venues at the selected geographic location, or a "new" location. An "established" location will include one or more virtual presence robots or vehicles, while a "new" location is one that is not included in the list of established locations, and/or one that does not currently include a virtual presence robot or vehicle, but for which one can be arranged. If the "new" location is requested, the system will take steps represented by block 18 to determine if it is possible to arrange a virtual presence at the location and, if it is possible, contact the appropriate entities to arrange the virtual presence. If an "established" location is selected, a menu or list of locations will be displayed, from which the user can select one, or optionally more than one, location as represented by block 19, then the program module 15 will proceed to block 20, which allows the user to select or reserve a timeframe for establishing a connection with the virtual presence device and going on a "tour." It is also possible for the user to skip the venue selection indicated by decision blocks 17-19 and simply reserve a time for the tour. In either case, the user may be offered specific itineraries at the selected venue or timeframe, or both, as indicated by block 20. The itineraries may include options such as stops at particular points of interest or selection of time intervals that the tour stops at the points of interest, or the tour may be conducted entirely according to a predetermined itinerary involving venues selected in advance by the system provider/operator. Any such itineraries may involve multiple virtual presence robots, vehicles, or combinations of robots and vehicles.

Optionally, instead of a paywall to enter the system or a subscriber fee, the user may be charged based on the selected itinerary, as indicated by block 21. Charges may be based on the length of a tour, selected stops, and/or on other features. For example, charges may be added for aerial views by drone rather than land-based vehicles, or entry fees for virtual visits to a museum or other attraction. Following payment, the tour session will begin immediately or at a scheduled future time, as indicated by block 23.

Preferably, the illustrated system provides for the possibility of enabling a tour to exceed a scheduled interval, in which case the payment block can provide for additional charges to the user's payment card or method. Alternatively, charges may be accrued, at least in part, based on elapsed time from the beginning of a tour.

The interactive map 40 is displayed by the function block 13 of FIG. 3 and illustrated in FIGS. 2A and 2B are the starting point for enabling a user to establish or select an itinerary for a tour. Circles 41 are nodes that represent general locations or sites at which virtual presence devices are situated, for which tours are available, and correspond to the icons 7 illustrated in FIG. 2A. As illustrated in FIGS. 4A and 4B, the green nodes 41 are locations with available devices, and the red nodes 41 are locations with devices that are not available at the time.

Figure 4A:
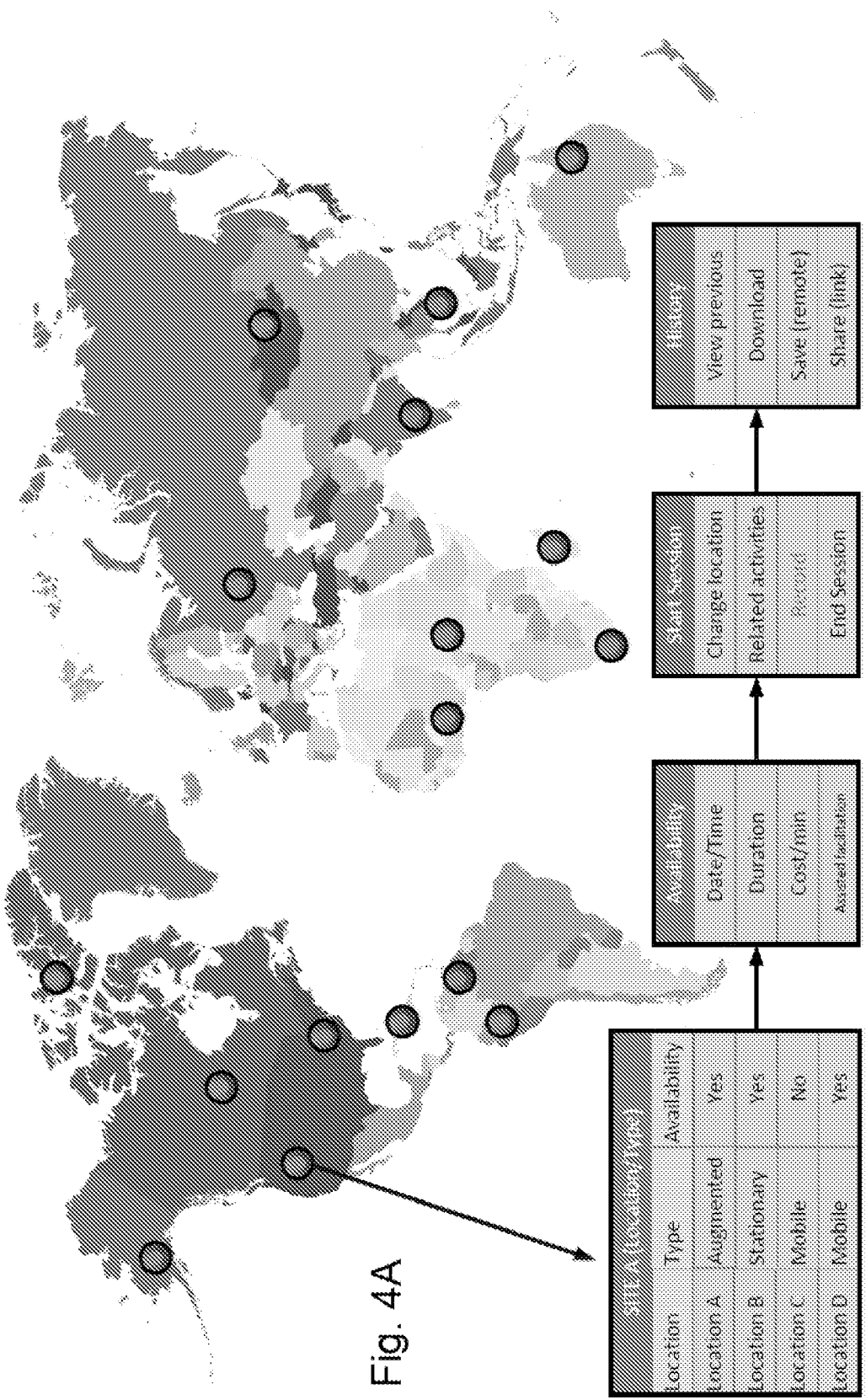
FIG. 4A is a schematic diagram that shows a hierarchical menu display presented to an end user in accordance with the principles of the preferred embodiment.
Figure 4B:
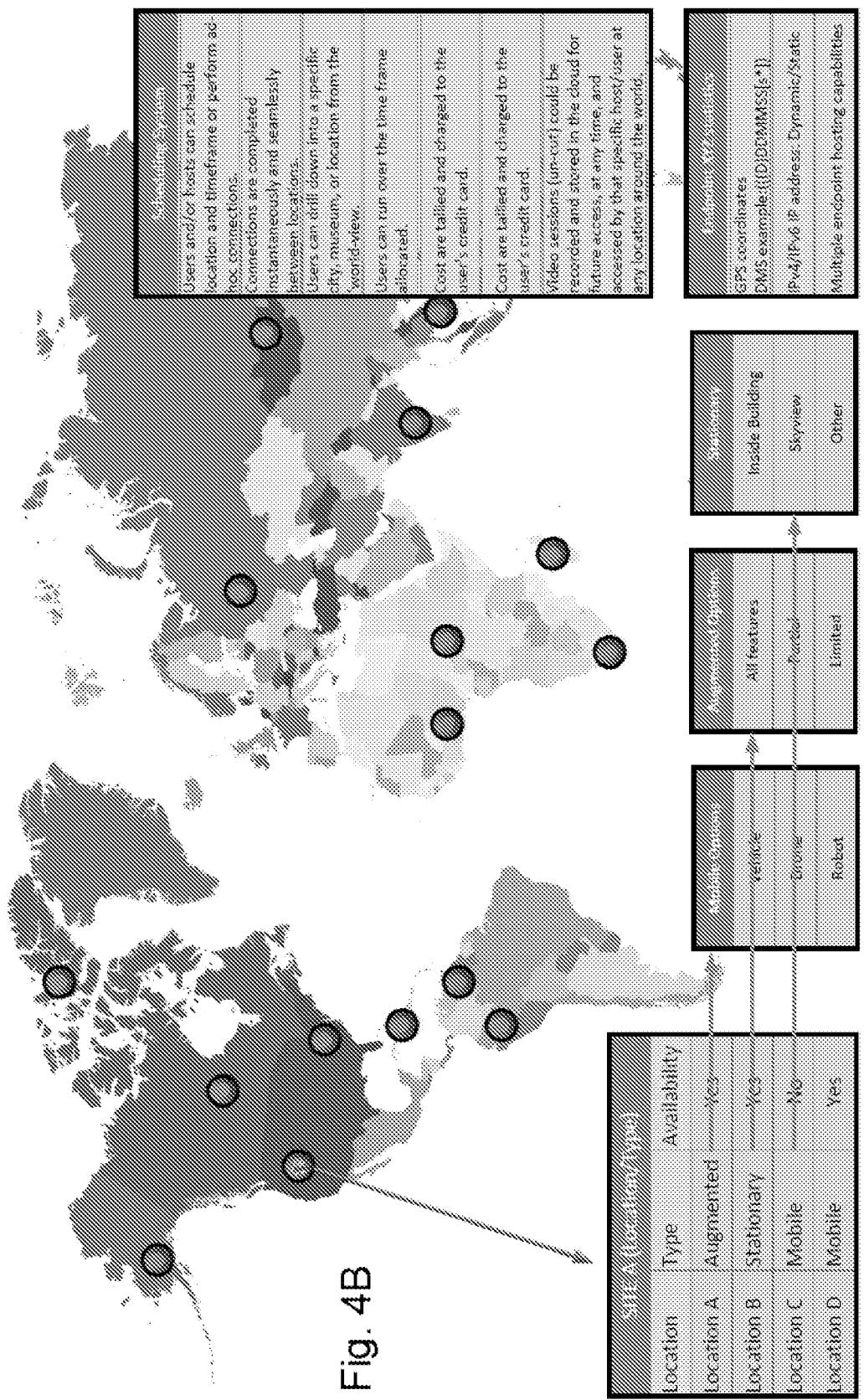
FIG. 4B illustrated contents of a query database and scheduling system of the embodiment illustrated in FIG. 4A.

FIG. 4A illustrates user options entered the query database, while FIG. 4B indicates fields in the query database that are used to track and enable operation of the virtual presence devices, and playback of video captured by the devices in order to provide the user with a virtual travel experience. The user options illustrated in FIG. 4A include a selection of a location and device type (block 42), selection or confirmation of date/time, duration, and cost options (block 48), options selectable by a user during a section (block 49), and options to playback a recorded session (block 50). Each of these options will be described in more detail below.

As illustrated in FIG. 4B, the selection of a site causes the user interaction module to refer to a query database and display a list of locations at the site, and the types of virtual presence entities currently available. The query database is divided into a location/type section that corresponds to block 42 in FIG. 4A and includes device location/geographic coordinates, and device type and temporal availability (i.e., dates and times when the device is available), a mobile options section 43, an augmented options section 44, and a "stationary" section 45. Although depicted as discrete sections, those skilled in the art will appreciate that each section may be in the form of a plurality of memory locations that do not need to be physically proximate or fixed. The memory locations may be located in single or multiple physical memory devices, including not limited static memories or drives, discs, cloud locations, and so forth.

The location/type section 42 of the query database includes entries for locations that may be selected by a user, the type of "tour" that may be carried out at the selected location or venue, and whether the "location," i.e., the device through which the tour is virtually carried out, is available at the desired time selected by the user, or immediately if the user wants an immediate tour or view of the desired location. As explained above, the location or venue may be an outdoor area, a museum, or any other attraction, while the "type" in query database section 42 refers to whether the tour is through a mobile or stationary device and whether additional options may be selected. The mobile device may include one or more robots, vehicles, drones, or a sequence of multiple mobile devices, as listed in database section 43. For example, the tour may begin with a drone flight over a city or town, followed by a "walking" tour of the town square via a robot. Stationary devices may consist of a video camera or feed. Features included in the database section or list 44 may include extra stops on the itinerary, different combinations of mobile devices and drones, the ability to interact with persons at the location of the tour through the virtual presence robot via two-way video conferencing, enhanced narration, and so forth. Finally, stationary options listed in query database section 45 include various camera locations, such as inside a building or a sky view, or other views such as a view of mountains, a water hole visited by animals, and so forth.

In order for the system of the preferred embodiment to seamless connect with the various mobile devices, section

43 of the query database of the illustrated example preferably includes data fields for registering current GPS coordinates of each mobile device, as indicated by block 46 in FIG. 4A. The devices may be addressable by IP addresses and integrate with geocaching, geographical routing, geographical protocols and GPS formats such as degrees, minutes, and seconds ((D)DDMMSS[s*]). The devices can include multiple endpoint hosting capabilities and network routing protocols including, but not limited to, unicast and multicast.

Block 47 in FIG. 2, and blocks 48-50 in FIG. 4A, illustrates the scheduling method represented by blocks 20-22 in FIG. 1. In addition, to providing for scheduled tours at selected or predetermined locations, the method can allow for users to run over an allocated time frame, and to be charged accordingly as indicated by block 48. Also, the system may include options, illustrated in blocks 49 and 50, for changing locations or departing from an itinerary, and for recording and storing a tour session, for playback at a future date or time and/or sharing via SMS, e-mail, or social media.

During execution of a tour, the system and method of the invention may provide additional "augmented reality" features, such as hyperlinks superposed on the video feed that enable a user to enhance the tour experience by, for example, ordering appropriate food from a delivery service, shop vendors at the remote location, or download additional information relevant to the itinerary.

Figures 5A, 5B:
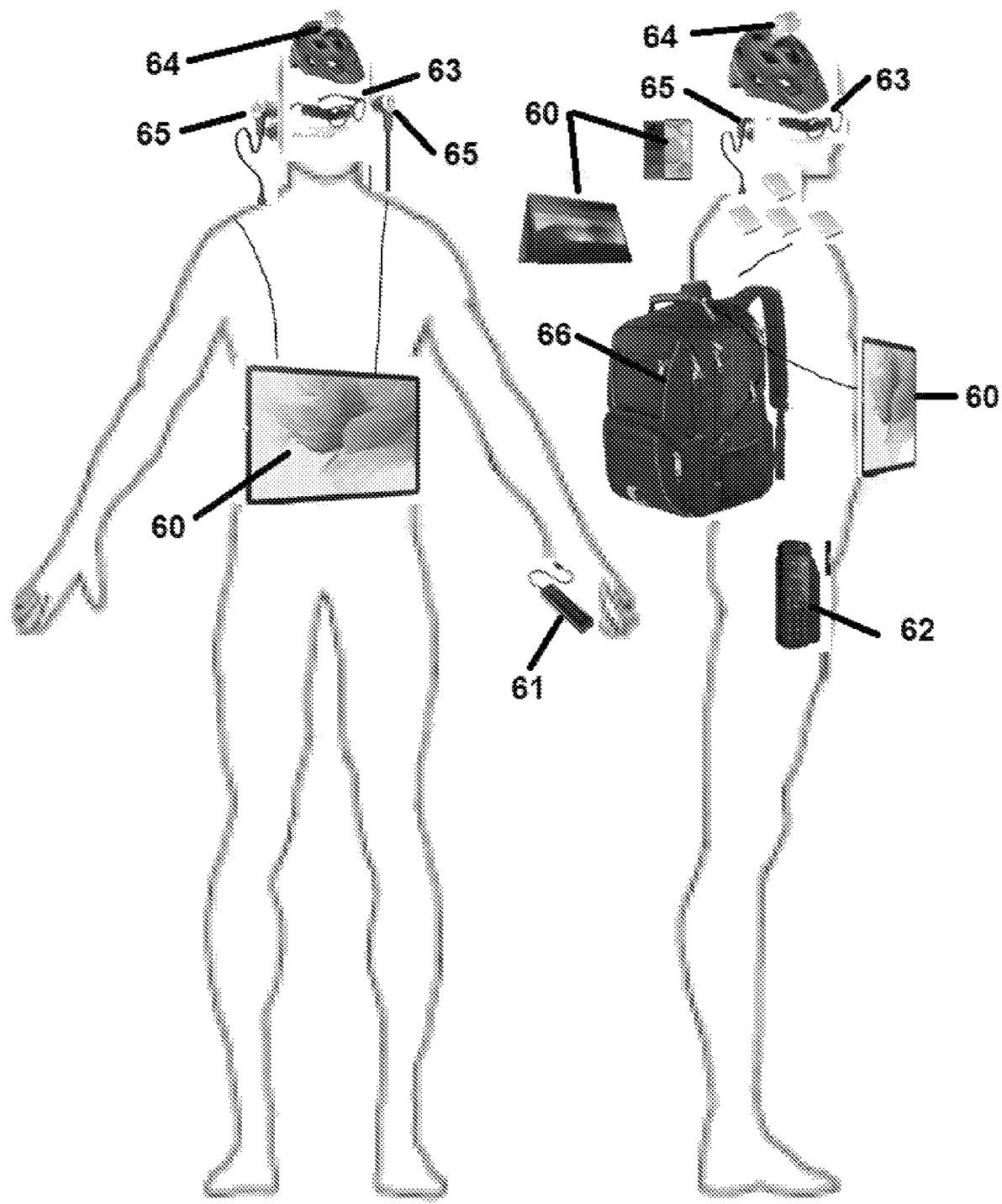
FIGS. 5A and 5B illustrate a virtual presence arrangement to be worn or carried by a humans at the remote location to provide a more human-centered virtual presence experience.
Figure 6:
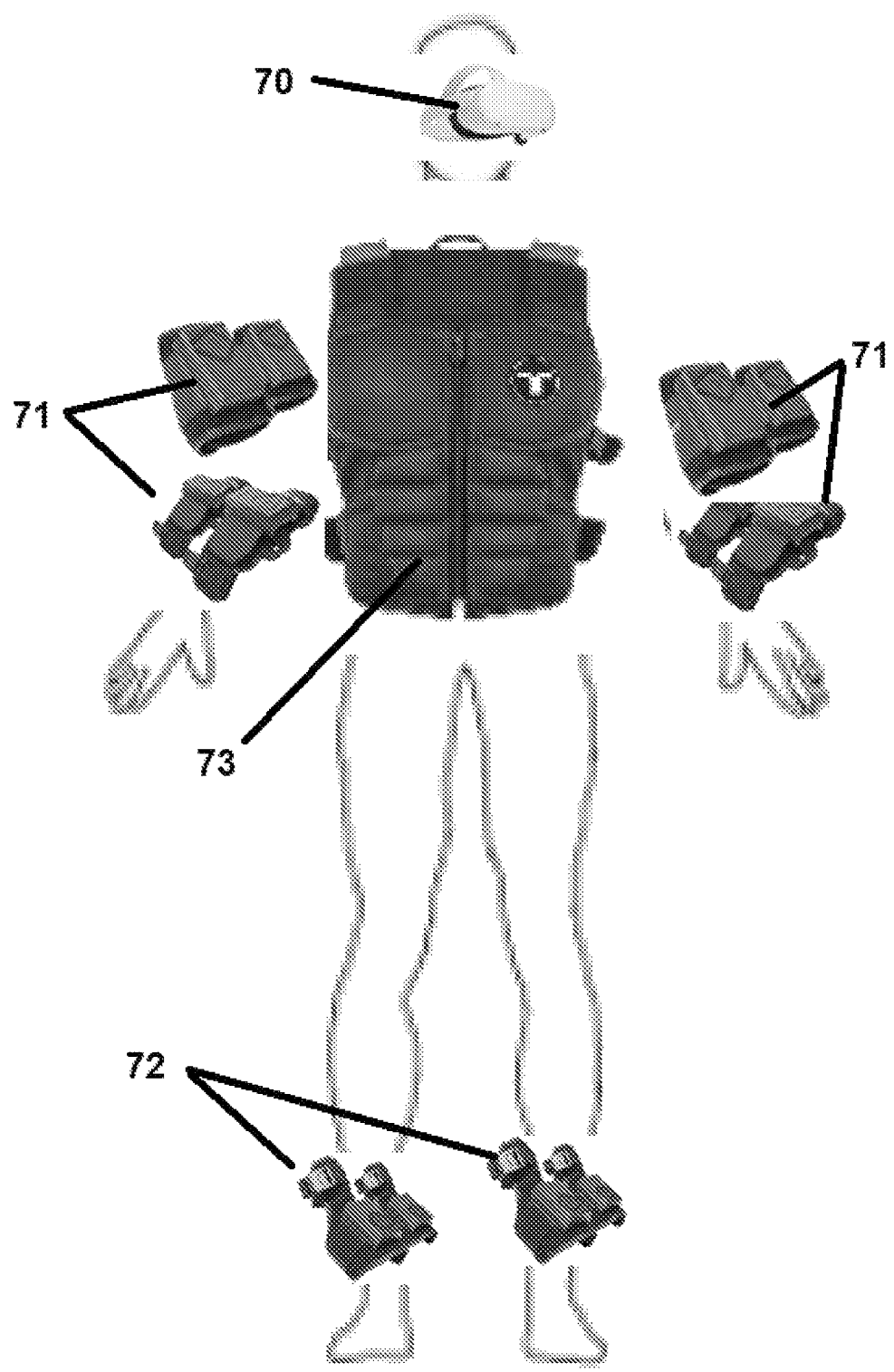
FIG. 6 illustrates optional virtual reality equipment arranged to be worn by users to provide users with a more immersive virtual presence experience than can be provided by merely streaming audio or video to the user's computing/communications device.

In addition to virtual presence robots, vehicles, drones, lanyards, and other conventional virtual presence devices as shown in FIG. 1, the virtual presence devices utilized in the illustrated embodiment may include the enhanced human centered virtual presence arrangement shown in FIGS. 5A and 5B, which are provided at the remote location and carried or worn by a human to provide video, audio, and sensory inputs for the virtual travel experience, and the virtual presence equipment shown in FIG. 6, which are worn by the user to enhance the virtual travel experience by providing enhanced 3D video and haptic feedback that provides the user with an enhanced virtual reality experience, as opposed to simply watching a video stream of the tour on the screen of a computer or mobile device.

In the arrangement shown in FIGS. 5A and 5B, a person at the remote location is equipped with one or more network-communications-capable devices 60 to which various input devices or sensors are connected, as described below. The communications-capable device may be, by way of example and not limitation, an Apple IPad™ or Samsung Galaxy Tab™, a smartphone, a notebook computer/PC that is connected to a tablet device by Bluetooth or a USB connector 61, and/or a satellite phone 62, to transmit signals from the input devices or sensors to the virtual travel experience server(s) described above via a cellular network, Wi-Fi hotspot, or the like, either directly or through a local server, to enable a user to experience sights and sounds at the remote location. The communications-capable device 60 may either be carried by the person at the remote location or secured to the person by a lanyard, belt, integration into an article of clothing or uniform, or by any other available securing device or method that might occur to those skilled in the art. The person may be a worker, student intern, volunteer, or any other person interested in serving as a virtual tour interface for remote users, either as a mute stand-in for a robot or as an active participant in the tour, capable of providing narration, commentary, and/or personalized two-way interaction or conversation with users as well as locals at the remote location to enhance the virtual travel experience.

The input devices shown in FIGS. 5A and 5B may include a variety of video and/or audio devices, or sensors, such as the following non-limiting examples: (i) a wearable virtual reality headset 63, such as Google Glasses™ (ii) a headpiece or helmet with a camera 64 for a wide forward view; and (iii) earbuds and microphone 65 for two-way audio communications. A backpack 66 may optionally be provided to carry equipment, batteries, and accessories.

In the arrangement shown in FIG. 6, the user is equipped with various optional virtual reality devices or equipment to enhance the virtual presence travel experience by providing 3D virtual reality video and motion or touch sensations, as opposed to simply viewing video and/or audio through a conventional video display of a computer or mobile communications device (which is also within the scope of the invention). The optional virtual reality devices may include a virtual reality headset 70 such as an Occulus Quest™, virtual reality gloves 71, virtual reality shoes 72, and/or a virtual reality body suit 73. Although not shown, to provide inputs for the virtual reality gloves, shoes, or body suit, corresponding haptic input sensors would be required at the remote location, either as part of a virtual presence robot, provided in a vehicle or drone, or worn by a human.

Although the invention is described in terms of "modules" and functional "blocks," it will be appreciated that the "modules" represent functions implemented by processor-executed instructions rather than discrete physical entities. In addition, those skilled in the art will appreciate that the invention should not be limited to the specific steps and features of the illustrated embodiment, and that modifications and variation of the illustrated embodiments may be made without departing from the scope of the invention.

For example, although a focus of the invention is on "virtual travel" experiences, the system and method of the invention is not necessarily limited to travel or tourism. The system and method of the invention may be used for other purposes that would benefit from virtual presence capabilities, such as searching for missing persons or responding to an "Amber Alert." People confronted with the Amber Alert or in search of a missing loved one could contact multiple robots or "human robots," i.e., humans wearing or equipped with virtual presence devices as described above, in multiple locations to show pictures of the missing or abducted person in order to be able to ask around and gain information to share with police at the remote location. This would also allow the search to extend to unsafe locations wherein the searcher would otherwise not be able to visit. In order to facilitate the search of multiple locations, video feeds from multiple virtual presence devices in the different locations could be displayed on a single monitor, allowing the user to immediately query individuals as they are encountered at the different locations, and quickly inform authorities or take appropriate action if information on the missing or abducted person turns up at any of the monitored locations.

Alternatively, the system and method of the invention may be set up in a "community service area" to allow police to dangerous areas, and/or have the virtual presence robot or device be able to act as an information kiosk and answer questions about the community, areas of interest, and more while at the same time assisting police in investigating crimes.

Another modification or additional feature of the system and method of the invention would be to place robots or virtual presence vehicles at positions adjacent to "bike-share" or scooter rental stations, in order to utilize the charging facilities of the stations and increase virtual presence availability or geographic coverage and freeing users from having to follow pre-chartered courses, allowing the users to explore a city as they wish, for example by jumping from one human robot to another, or jumping from a robot to a human robot, without having to worry about travel time.

Other modifications or additional features of the system and method of the invention would be to (i) include camera/display raising/lowering mechanisms in the virtual presence robots used by the system and method of the invention, so that the camera and/or display height can be adjusted to allow interaction with both standing and seated persons at a remote locations, as well as with persons of different heights. The mechanism could be similar to mechanisms currently utilized by food delivery robots deployed by George Mason University in Fairfax, Virginia, and (ii) include or employ facial recognition software through which a user could input pictures of friends or colleagues and enables use of a roaming virtual presence robot or device to virtually meet up with the friends or colleagues in the remote location.

The system and method of the invention could also be set up to enable multiple users to share a virtual presence device by broadcasting a preset itinerary for the device and allowing the multiple users to share a virtual presence display at the remote location, allowing different individual viewers to ask questions of persons encountered during a tour in a manner similar to a video conference interface. The video conference interface could be similar to a Zoom™ interface in which a video of the person speaking is highlighted or moved from background to foreground of the shared display.

In addition, multiple users may optionally be enabled to vary the movements or activities of a remote presence robot or human carrying a remote presence device based on a vote of the multiple users. For example, if the remote presence device is moving through a gallery, a majority of the group with access to the remote presence device could determine which exhibits to view. Other users would have the option of switching to a different virtual presence device or continuing with the experience determined by the majority vote.

Still further, the system and method of the invention could be used to anonymously access remote cameras for a variety of purposes, such as monitoring vehicle repairs by utilizing one or more heat-protected cameras situated with the vehicle, for example in the engine bay (utilizing a heat protected camera), the vehicle chassis, and/or the interior or the vehicle. Other remote cameras that could be accessed might include, by way of example and not limitation, police body cam video (with proper approval), or mobile video cameras carried by mountain or rock climbers, astronauts, divers, and other adventurers, or by drones.

The system and method of the invention could also include a robot control feature that would enable the robot to authenticate, run background checks, and enable a home repair contractor or delivery person to access a home to make repairs or install a delivered appliance when the owner is not present, and further to allow the owner to monitor the movements and activities of the contractor or installer through a video and/or audio feed. Authentication of the contractor or delivery person could include facial recognition or biometric identification, while background checks could include providing access to a criminal or sex offender database, with automatic notification of police if the visitor failed the authentication or background check.

Finally, the system and method of the invention could also include a dispatch system at the remote location that allows human robots, i.e., persons wearing a virtual presence device, to indicate availability and location at any time. Such a system would allow tracking, employment, and compensation of the human robots in a manner similar to systems used by rideshare apps such as Uber and Lyft.

Accordingly, the invention should not be limited to the features, modifications, or variations described above, but rather should be limited solely by the appended claims.

What is claimed is:

1. A method of providing users with a virtual presence experience, comprising the steps of:
   providing a plurality of virtual presence devices, including different types of virtual presence devices, at different locations geographically remote from locations of the users;
   storing IP addresses and geographic coordinates of each of the plurality of virtual presence devices in a query database, together with temporal availability;
   presenting the users with at least one map that enables the users to select at least one of the different locations;
   retrieving from the query device a list of virtual presence devices at the selected one of the different locations, together with a schedule of device availabilities;
   enabling the users to select dates and times consistent with device availabilities at the selected one of the different locations; and
   enabling the users to select additional locations to construct an itinerary for the virtual presence experience consistent with additional virtual presence device locations and availability.

2. The method of providing users with a virtual presence experience as claimed in claim 1, wherein the different types of virtual presence devices include virtual presence robots.

3. The method of providing users with a virtual presence experience as claimed in claim 2, wherein the different types of virtual presence devices further include at least one of (i) drones, (ii) land vehicles, (iii) aquatic vessels, (iv) sensors, video, audio and communications equipment carried by a human, and (v) fixed video capture devices.

4. The method of providing users with a virtual presence experience as claimed in claim 1, wherein the different types of virtual presence devices include virtual presence devices arranged to be carried by a human at the remote location, including network-communications-capable equipment and input devices selected from sensors, video, and/or audio devices.

5. The method of providing users with a virtual presence experience as claimed in claim 4, wherein the human is provided with an app that allows the human to indicate his or her availability and specific location.

6. The method of providing users with a virtual presence experience as claimed in claim 1, wherein the query database stores indicators as to whether features of the virtual presence devices have been selected by a user for activation during a scheduled itinerary.

7. The method of providing users with a virtual presence experience as claimed in claim 6, wherein the selectable features include providing users an ability to pause and/or control a virtual presence device to change camera angle or position to look around while the itinerary is being executed.

8. The method of providing users with a virtual presence experience as claimed in claim 6, wherein the selectable features include providing users with an ability to carry out a two-way teleconference with a person at the location of the virtual presence device.

9. The method of providing users with a virtual presence experience as claimed in claim 1, wherein the at least one map includes a world map with icons that link to at least one map of a specific region or geographic entity and at least one map including additional icons that represent virtual presence devices within the specific region or geographic entity.

10. The method of providing users with a virtual presence experience as claimed in claim 1, further including the step of charging a user based on elapsed time from a beginning of an itinerary, with optional charges for selected features and types of device(s).

11. The method of providing users with a virtual presence experience as claimed in claim 1, further comprising a step of providing an option of recording a virtual travel experience as it is being carried out for future playback or sharing.

12. The method of providing users with a virtual presence experience as claimed in claim 1, wherein the users are further provided with an option of a more immersive virtual presence experience via a virtual reality headset and/or wearable haptic feedback devices.

13. The method of providing users with a virtual presence experience as claimed in claim 1, wherein the virtual presence devices include robots or vehicles located at bike-share or scooter rental stations for charging.

14. The method of providing users with a virtual presence experience as claimed in claim 1, wherein the virtual presence devices include devices configured for facial recognition of individuals whose pictures have been input by at least one of the users.

15. The method of providing users with a virtual presence experience as claimed in claim 1, wherein the virtual presence devices include devices configured to simultaneously display video feeds from multiple said users, allowing the multiple users to share a virtual travel experience and interact with persons at the remote location through the shared devices.

16. The method of providing users with a virtual presence experience as claimed in claim 15, wherein movements or activities of at least one of the virtual presence devices may be determined by a vote of the multiple said users.

17. The method of providing users with a virtual presence experience as claimed in claim 1, wherein at least one of the virtual devices is a robot configured to enable authentication of and grant entry to a home repair technician or delivery person when a homeowner is away from home, and to enable monitoring of the technician or delivery person during repairs or installation of a delivered item.

18. The method of providing users with a virtual presence experience as claimed in claim 1, wherein the method further provides the users with anonymous access to remote cameras situated in a compartment of a vehicle to monitor vehicle repairs, or carried by a person during an adventure or hazardous activity.

19. The method of providing users with a virtual presence experience as claimed in claim 1, wherein the virtual travel experience enables users to search for a missing person, assist in an police investigation, or monitor an area that is dangerous to visit.

20. A system for providing users with a virtual presence experience, comprising the steps of:
   a plurality of virtual presence devices, including different types of virtual presence devices, situated at different locations geographically remote from locations of the users; and
   at least one server including or connected to a query database for storing IP addresses and geographic coordinates of each of the plurality of virtual presence devices, together with temporal availability of each of the respective virtual presence devices, wherein the at least one server is configured to:
   present the users with at least one map that enables the users to select at least one of the different locations;
   retrieve from the query device a list of virtual presence devices at the selected one of the different locations, together with a schedule of device availabilities;
   enable the users to select dates and times consistent with device availabilities at the selected one of the different locations; and
   enable the users to select additional locations to construct an itinerary for the virtual presence experience consistent with additional virtual presence device locations and availability.

21. The system for providing users with a virtual presence experience as claimed in claim 20, wherein the different types of virtual presence devices include virtual presence robots.

22. The system for providing users with a virtual presence experience as claimed in claim 20, wherein the different types of virtual presence devices further include at least one of (i) drones, (ii) land vehicles, (iii) aquatic vessels, (iv) sensors, video, audio and communications equipment carried by a human, and (v) fixed video capture devices.

23. The system for providing users with a virtual presence experience as claimed in claim 20, wherein the different types of virtual presence devices include virtual presence devices arranged to be carried by a human at the remote location, including network-communications-capable equipment and input devices selected from sensors, video, and/or audio devices.

24. The system for providing users with a virtual presence experience as claimed in claim 23, wherein the human is provided with an app that allows the human to indicate his or her availability and specific location.

25. The system for providing users with a virtual presence experience as claimed in claim 20, wherein the query database stores indicators as to whether features of the virtual presence devices have been selected by a user for activation during a scheduled itinerary.

26. The system for providing users with a virtual presence experience as claimed in claim 25, wherein the selectable features include providing users an ability to pause and/or control a virtual presence device to change camera angle or position in order to look around while the itinerary is being executed.

27. The system for providing users with a virtual presence experience as claimed in claim 25, wherein the selectable features include providing users with an ability to carry out a two-way teleconference with a person at the location of the virtual presence device.

28. The system for providing users with a virtual presence experience as claimed in claim 20, wherein the at least one map includes a world map with icons that link to at least one more detailed map of a specific region or geographic entity, the at least one more detailed map including additional icons that represent virtual presence devices within the specific region or geographic entity.

29. The system for providing users with a virtual presence experience as claimed in claim 20, wherein the server is further configured to charge a user based on elapsed time from a beginning of an itinerary, with optional charges for selected features and types of devices.

30. The system for providing users with a virtual presence experience as claimed in claim 20, wherein the server is further configured to offer an option of recording a virtual travel experience as it is being carried out for future playback or sharing.

31. The system for providing users with a virtual presence experience as claimed in claim 20, further comprising virtual reality equipment for providing a more immersive virtual presence experience, including a virtual reality headset and/or wearable haptic feedback devices.

32. The system for providing users with a virtual presence experience as claimed in claim 20, wherein the virtual presence devices include robots or vehicles located at bike-share or scooter rental stations for charging.

33. The system for providing users with a virtual presence experience as claimed in claim 20, wherein the virtual presence devices include devices configured for facial recognition of individuals whose pictures have been input by at least one of the users.

34. The system for providing users with a virtual presence experience as claimed in claim 20, wherein the virtual presence devices include devices configured to simultaneously display video feeds from multiple said users, allowing the multiple users to share a virtual travel experience and interact with persons at the remote location through the shared devices.

35. The system for providing users with a virtual presence experience as claimed in claim 34, wherein movements or activities of at least one of the virtual presence devices may be determined by a vote of the multiple said users.

36. The system for providing users with a virtual presence experience as claimed in claim 20, wherein at least one of the virtual devices is a robot configured to enable authentication of and grant entry to a home repair technician or delivery person when a homeowner is away from home, and to enable monitoring of the technician or delivery person during repairs or installation of a delivered item.

37. The system for providing users with a virtual presence experience as claimed in claim 20, wherein the method further provides the users with anonymous access to remote cameras situated in a compartment of a vehicle to monitor vehicle repairs, or carried by a person during an adventure or hazardous activity.

38. The system for providing users with a virtual presence experience as claimed in claim 20, wherein the virtual travel experience enables users to search for a missing person, assist in an police investigation, or monitor an area that is dangerous to visit.

\* \* \* \* \*